T. E. MURRAY, Jr. & F. V. MAGALHAES.
METER TESTING DEVICE.
APPLICATION FILED NOV. 17, 1915.
1,196,472.
Patented Aug. 29, 1916.
3 SHEETS—SHEET 1.
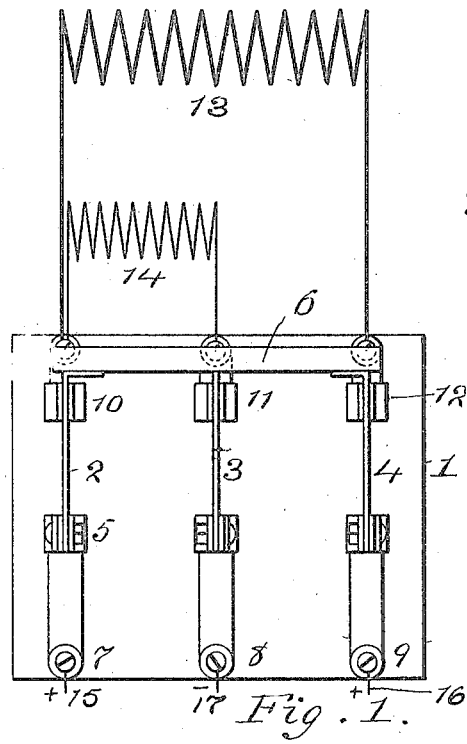
Fig. 1.
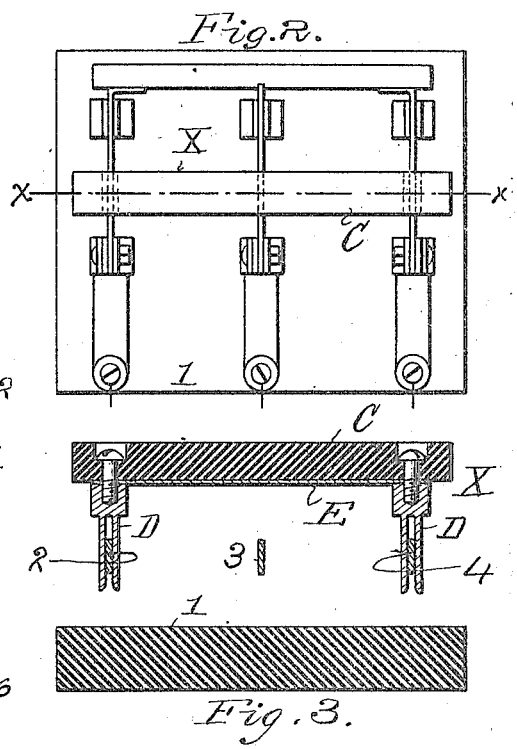
Fig. 2.
Fig. 3.
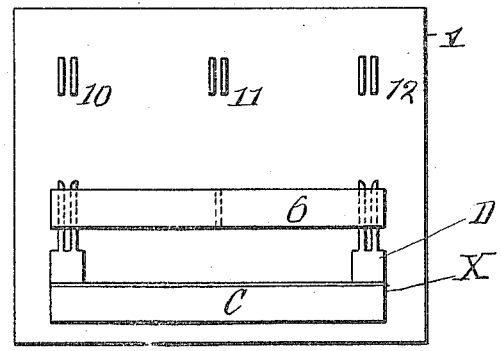
Fig. 4.
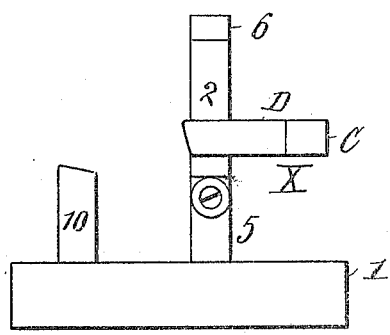
Fig. 5.
Inventors
Thomas E. Murray Jr
Frank V. Magalhaes
By their Attorney

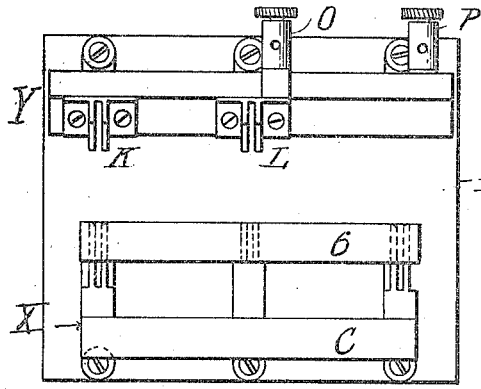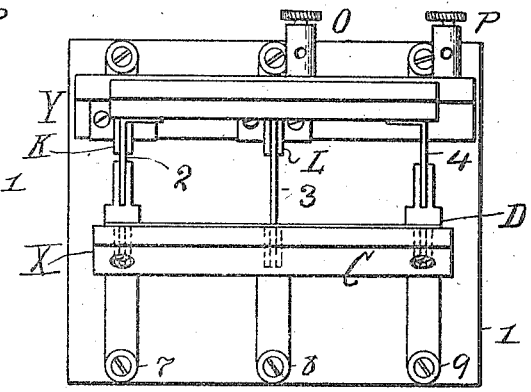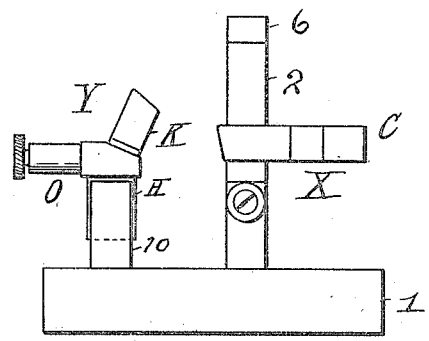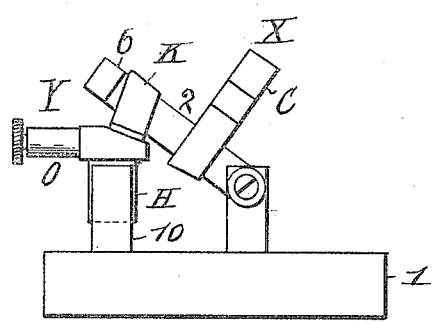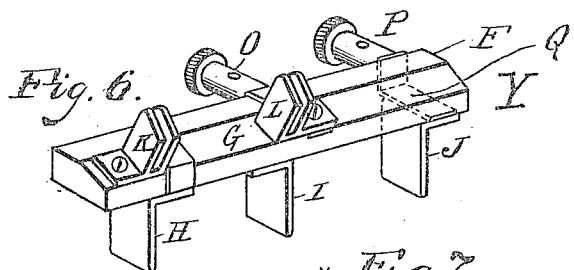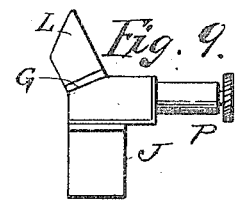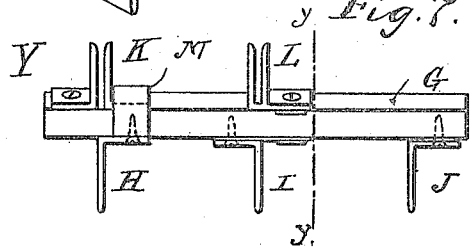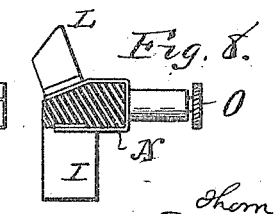

T. E. MURRAY, Jr. & F. V. MAGALHAES.
METER TESTING DEVICE.
APPLICATION FILED NOV. 17, 1915.
1,196,472.
Patented Aug. 29, 1916.
3 SHEETS—SHEET 3.
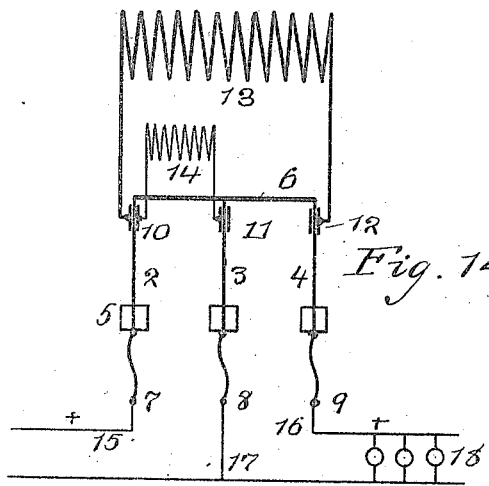
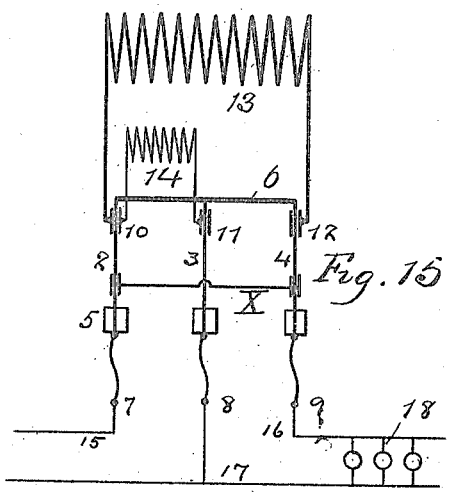
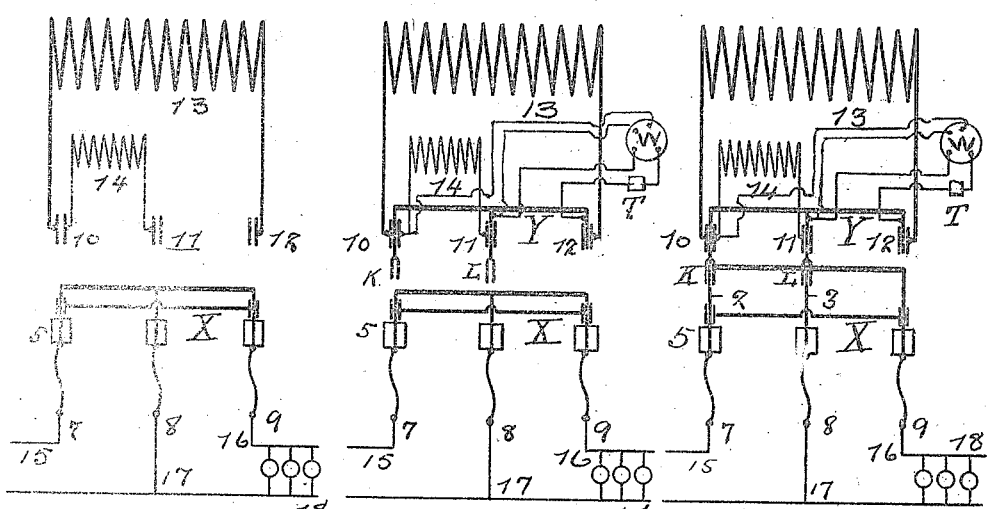

UNITED STATES PATENT OFFICE.

THOMAS E. MURRAY, JR., AND FRANK V. MAGALHAES, OF NEW YORK, N. Y., ASSIGNORS TO THOMAS E. MURRAY, OF NEW YORK, N. Y.

METER-TESTING DEVICE.

1,196,472. Specification of Letters Patent. Patented Aug. 29, 1916.

Application filed November 17, 1915. Serial No. 61,896.

*To all whom it may concern:*

Be it known that we, THOMAS E. MURRAY, Jr., and FRANK V. MAGALHAES, citizens of the United States, residing at New York, in the county of New York and State of New York, have invented a certain new and useful Improvement in Meter-Testing Devices, of which the following is a specification.

The invention is a device for testing watt-hour meters in service by means of a pair of specially constructed test plugs used in connection with the regularly installed service switch.

The object is to eliminate all special construction of the switch to adapt it to test purposes, and to concentrate such special construction in the plugs. By reason of the removal of the special features required for testing from the switch itself, it is obvious that large economy results, because the same plugs may be applied to an indefinite number of similar service switches. The cost of two plugs which would be sufficient for an inspection districts comprising say 1500 meters is very small. The cost of providing each one of the 1500 service switches in that district with its own testing connections would be relatively very large.

In the accompanying drawings—Figure 1 is a plan view of a service switch and meter to which our testing plugs are to be applied, the switch being shown closed. Fig. 2 is a plan view of the switch (the meter and connections being omitted for clearness) still closed, but with the testing plug X in position. Fig. 3 is a cross section on the line $x, x$ of Fig. 2. Fig. 4 is a plan view of the switch open, with the testing plug X still in place. Fig. 5 is an end view of the same. Fig. 6 is a perspective view of the testing plug Y. Fig. 7 is a rear elevation of said plug. Fig. 8 is a cross section on the line $y, y$ of Fig. 7. Fig. 9 is an end view of the plug Y. Fig. 10 is a plan view of the switch open, with the testing plug X on the levers and the plug Y in place on the meter terminals. Fig. 11 is an end elevation of the same. Fig. 12 is a plan view of the switch closed, with the plug X in place and the switch levers coöperating with the clips on plug Y, the device then being in testing position. Fig. 13 is an end elevation of Fig. 12. Figs. 14 to 18, inclusive, are electrical diagrams—Fig. 14 showing the connections when the parts are in the position shown in Fig. 1; Fig. 15 corresponding in like manner to Figs. 2 and 3; Figs. 16 to Figs. 4 and 5; Fig. 17 to Figs. 10 and 11, and Fig. 18 to Figs. 12 and 13. In Figs. 4, 5, 11 and 12 the terminals 7, 8, 9 have been omitted.

Similar numbers and letters of reference indicate like parts.

In Figs. 1 and 14 is shown a typical meter and service switch, to which our testing plugs, as hereinafter explained, are to be applied. 1 is the base of the switch, preferably porcelain or other insulating material. 2, 3 and 4 are switch levers pivoted in lugs 5 and connected by the cross bar 6 of insulating material. These lugs 5 are electrically connected to the terminals 7, 8, 9, and the levers 2, 3, 4 respectively coöperate with the spring contacts 10, 11, 12. The contacts 10, 12 are connected to the ends of the current coil 13 of the watt-hour meter, and the contacts 10, 11 to the ends of the potential coil 14. The plus line conductors 15, 16 are connected to the terminals 7, 9, and the return line conductor 17 to the terminal 8. The load, here represented by lamps, is indicated at 18, Fig. 14.

We provide two plugs, indicated generally by the letters X and Y. The plug X, Fig. 3, comprises a bar C of insulating material, on the under side of which are secured two pairs of contact clips D, D, electrically connected by a metal strip E on the under side of bar C. The plug Y, Figs. 6, 7, 8, 9, comprises a bar F of insulating material, in cross section a mutilated parallelogram, having one angle beveled off to form an inclined surface G. On the under side of the bar are secured three contact plates H, I, J. On the upper inclined surface G of the bar are secured two contact clips K, L, which extend at right angles to said inclined surface and are beveled at their outer ends. The contact clips K, L are electrically connected to the contact plates H, I by metal strips M, N. To the strip N is secured a binding post O. A similar binding post P is connected by metal strip Q to contact plate J. By the use of these two plugs X, Y and suitable manipulation of the service switch, we can shunt the customer's load and connect the testing apparatus, here represented by a watt-meter W and test load T connected to the binding posts O and P, and so test the meter.

In making the test we proceed as follows: The switch being closed, as shown in Figs. 1 and 14, we place the plug X upon the switch levers 2, 4, as shown in Figs. 2, 3 and 15, thus shunting the customer's load 18. We may then swing back the switch levers, as shown in Figs. 4, 5 and 16, and so open the switch without interrupting circuit to load. We then place the plug Y in position, as shown in Figs. 10, 11 and 17, the contact plates H, I entering the clips 10, 11. We then swing forward the switch levers 2, 3, 4, so that the levers 2, 4 coöperate with the clips K, L on plug Y, as shown in Figs. 12, 13 and 18, from which it will be obvious that the meter is properly connected to the testing watt-meter W and portable test load T.

It will be apparent that our invention is adaptable to two or three-wire, single or polyphase meters, assuming always that a service control switch substantially as herein shown is available. It will also be observed that the plug X coöperates with the movable member of the switch to shunt the load around the meter; that the plug Y coöperates with the meter terminals to connect the electrical testing apparatus in circuit with the meter; and that when contacts on the two plugs are by the movement of the switch levers brought into coöperation, circuit is established through the meter and said testing apparatus. The operation results from the coöperative relation of the two separate plugs after they have respectively been placed in position to establish the shunting of the load and the connection of the meter to the testing apparatus.

We claim:

1. In combination with line conductors, a meter and a service switch of the type set forth, a separable device coöperating with the meter terminals for connecting electrical testing apparatus in circuit with the meter, a separable device carried by the movable member of said switch for shunting the load around the meter, and contacts on said first-named device coöperating with the movable member of said switch to establish circuit through said meter and said testing apparatus.

2. In combination with line conductors, a meter and a service switch of the type set forth, two gang plugs, one of said plugs coöperating with the meter terminals to connect electrical testing apparatus in circuit with said meter, the other plug coöperating with and carried by the switch levers to shunt the load around said meter, and contacts on said first-named plug coöperating with said switch levers to establish circuit through said meter and said testing apparatus.

In testimony whereof we have affixed our signatures in presence of two witnesses.

THOMAS E. MURRAY, Jr.
FRANK V. MAGALHAES.

Witnesses:
GERTRUDE T. PORTER,
MAY G. McGARRY.